(12) United States Patent
Järvinen et al.

(10) Patent No.: US 9,109,570 B2
(45) Date of Patent: Aug. 18, 2015

(54) TIDAL ADJUSTMENT ARRANGEMENT FOR A WAVE ENERGY RECOVERY SYSTEM

(75) Inventors: Arvo Järvinen, Vantaa (FI); Rauno Koivusaari, Koria (FI)

(73) Assignee: AW-ENERGY OY, Vantaa (FI)

( * ) Notice: Subject to any disclaimer, the term of this patent is extended or adjusted under 35 U.S.C. 154(b) by 269 days.

(21) Appl. No.: 13/814,436

(22) PCT Filed: Aug. 18, 2010

(86) PCT No.: PCT/FI2010/050652
§ 371 (c)(1),
(2), (4) Date: Mar. 7, 2013

(87) PCT Pub. No.: WO2012/022824
PCT Pub. Date: Feb. 23, 2012

(65) Prior Publication Data
US 2013/0227942 A1    Sep. 5, 2013

(51) Int. Cl.
*F03C 1/00* (2006.01)
*F03B 13/10* (2006.01)
*F03B 7/00* (2006.01)
*F03B 13/18* (2006.01)

(52) U.S. Cl.
CPC ............... *F03B 7/00* (2013.01); *F03B 13/182* (2013.01); *F05B 2240/915* (2013.01); *F05B 2240/9151* (2013.01); *Y02E 10/28* (2013.01); *Y02E 10/38* (2013.01)

(58) Field of Classification Search
CPC .... F03B 7/00; F03B 13/182; F03B 2240/915; F03B 2240/9151; Y02E 10/28; Y02E 10/38
USPC ................................ 60/495–507; 290/42, 53
See application file for complete search history.

(56) References Cited

U.S. PATENT DOCUMENTS

| | | | | |
|---|---|---|---|---|
| 4,371,788 | A * | 2/1983 | Smith, Jr. ......................... | 290/42 |
| 7,023,104 | B2 * | 4/2006 | Kobashikawa et al. ......... | 290/42 |
| 7,626,281 | B2 * | 12/2009 | Kawai .............................. | 290/54 |
| 7,768,144 | B2 * | 8/2010 | North et al. ..................... | 290/53 |
| 7,834,474 | B2 * | 11/2010 | Whittaker et al. .............. | 290/53 |

FOREIGN PATENT DOCUMENTS

| WO | WO 2006/100436 A1 | 9/2006 |
|---|---|---|
| WO | WO 2007/019608 A1 | 2/2007 |

* cited by examiner

*Primary Examiner* — Hoang Nguyen
(74) *Attorney, Agent, or Firm* — Birch, Stewart, Kolasch & Birch, LLP

(57) ABSTRACT

This invention relates to a tidal adjustment arrangement for a wave energy recovery system where the wave energy recovery system comprising at least a body (2), a wing (3a) hinged at its lower edge onto the body (2) to make a reciprocating motion in response to kinetic energy of waves or tidal currents and a power-take-off (PTO) means (3b). The arrangement comprises at least a support means (6) capable to change the vertical position of the wing (3a).

20 Claims, 4 Drawing Sheets

TIDAL ADJUSTMENT ARRANGEMENT FOR A WAVE ENERGY RECOVERY SYSTEM

Figure 1:
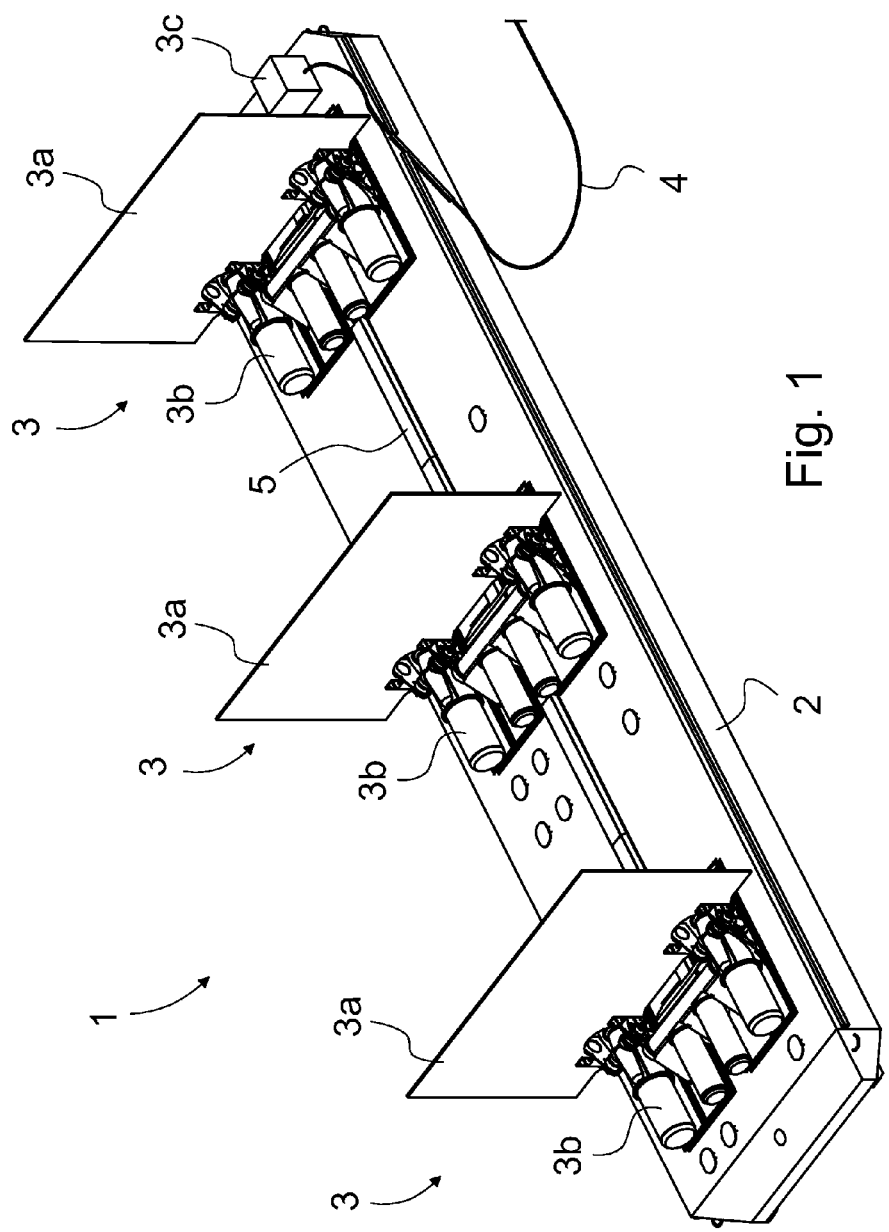

The present invention relates to a tidal adjustment arrangement for a wave energy recovery system as defined in the preamble of claim 1.

The tidal adjustment arrangement according to the invention is suited very well for instance to be used in connection with an apparatus having a plate or sail like wing hinged with its lower edge to make a reciprocating movement caused by wave energy or tidal energy of seawater. The wave energy or tidal energy collected by the apparatus is further converted with a wave energy converter system for instance to electric energy and/or fresh water.

According to the prior art there are various types of wave energy recovery systems where the arrangements include a base and one or more wings of plate type pivotally connected to the base to make a reciprocating or oscillating movement about a rotation axis in response to wave forces or tidal forces. The oscillating movement is then converted for example to electric energy with the help of a generator or alike.

Due to prevailing ocean conditions, which are very much fluctuating, the efficiency of the known wave energy recovery systems have been generally very poor. It has been extremely difficult to adjust the known wave energy recovery systems to collect maximum wave energy in different tidal situations and also both during calm ocean conditions and during stormy ocean conditions. The known wave energy recovery systems have generally not handled well these kinds of extreme conditions and therefore the total efficiency has been so low.

One problem has been the adjustment of the height of the wing according to prevailing tidal conditions. The height of the sea level varies often several meters between a low tide and a high tide, and in case the oscillating wing is hinged near the sea bottom it cannot be used optimally in all tidal situations. For example, if the wing reaches from the bottom to the surface during the low tide the upper edge of the wing remains far from the surface during the high tide and a huge portion of the wave energy that could have been collected immediately under the surface is lost. Correspondingly, if the wing reaches from the bottom to the surface during the high tide the upper edge of the wing extends high from the surface during the low tide and is therefore both visually undesirable and also loses its ability to collect the maximum amount of wave energy because of the wind that decreases the collecting power.

A known solution for the adjustment of the height of the wing according to prevailing tidal and wind conditions is shown in Japanese patent publication No. JP4358769 (A). The publication shows an apparatus having a plate like wing that is hinged onto the bottom of the sea and arranged to reciprocate along with the waves. On the upper part of the wing there is a moving part with a float that keeps the upper edge of the moving part always on the surface of the water. When the tide level changes the float with the moving part moves up and down according to the tide level. Thus, when the tide level is high the float moves up and lengthens the height of the wing, and when the tide level is low the float moves down and shortens the height of the wing correspondingly. This solution like other similar floating solutions has a disadvantage that it is not suitable for stormy sea conditions, and adjustments or protective arrangements against stormy sea conditions are difficult and costly to make. A further disadvantage of the Japanese solution is that it does neither optimize nor balance the capture according to the prevailing sea conditions.

The object of the present invention is to eliminate the drawbacks described above and to achieve a reliable and efficient tidal adjustment arrangement for the wave energy recovery system in order to be able to capture a maximum amount of available wave or tidal energy. Likewise the object of the present invention is to achieve a tidal adjustment arrangement for the wave energy recovery system where the height and/or height position of the plate or sail like wing is easily adjustable. The tidal adjustment arrangement for the wave energy recovery system according to the invention is characterized by what is presented in the characterization part of claim 1. Other embodiments of the invention are characterized by what is presented in the other claims.

The solution of the invention has the advantage that thanks to the advanced adjustment arrangement the energy conversion can be maximized because the system is very adaptable to various ocean conditions. Thus the maximum power from the wing motion from the low tide to the high tide can be supplied to the power-take-of (PTO) means of the wave energy recovery system. Another advantage is the fact that the wing can be totally under the surface of the water so that no undesirable parts are visible. A further advantage is that the adjustment arrangement according to the invention helps to capture more energy in calm conditions when the waves are small. Yet a further advantage is the ability to use the ready-made tide tables for tidal adjustment. That makes the adjustment easy and reliable. Yet a further advantage is a controlled ability to protect the apparatus against stormy sea conditions.

Figures 2, 3:
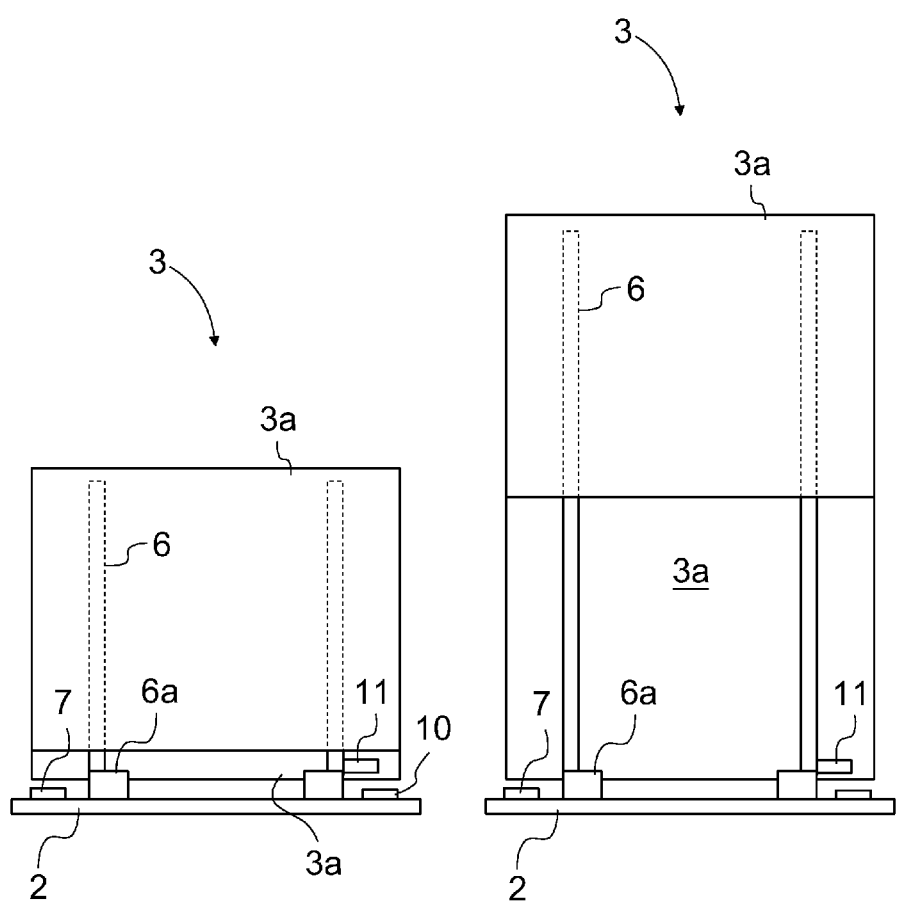
Figures 4, 5:
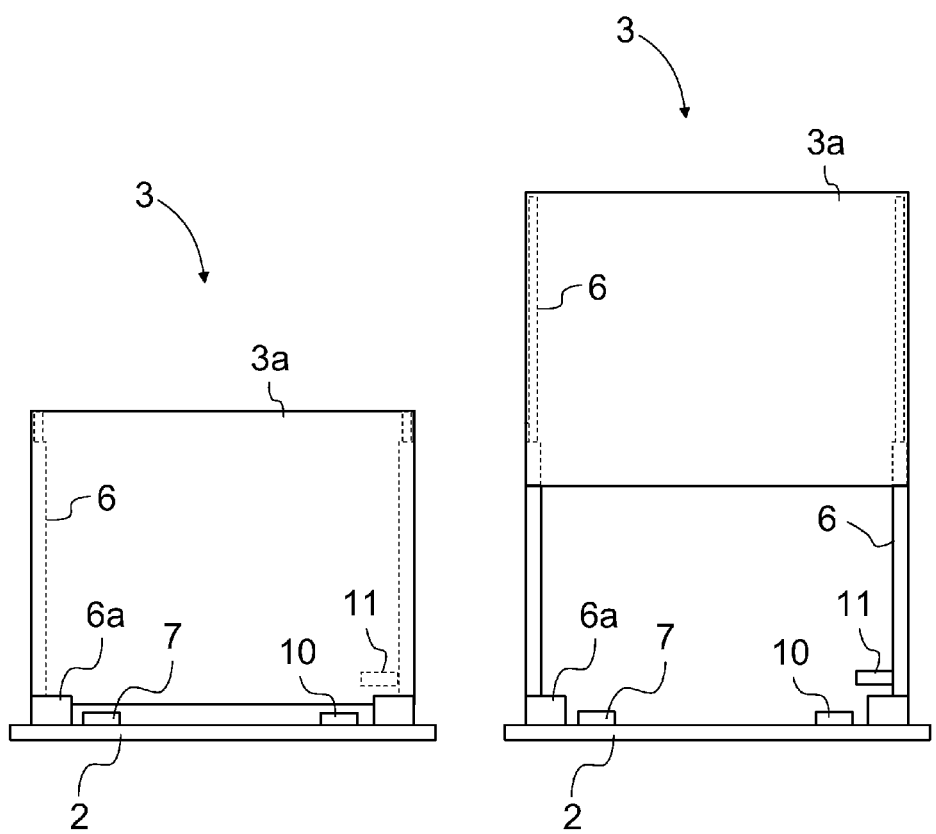
Figure 6:
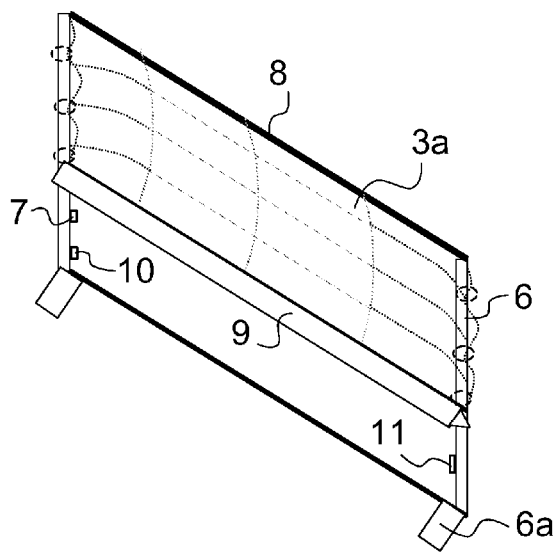
Figure 7:
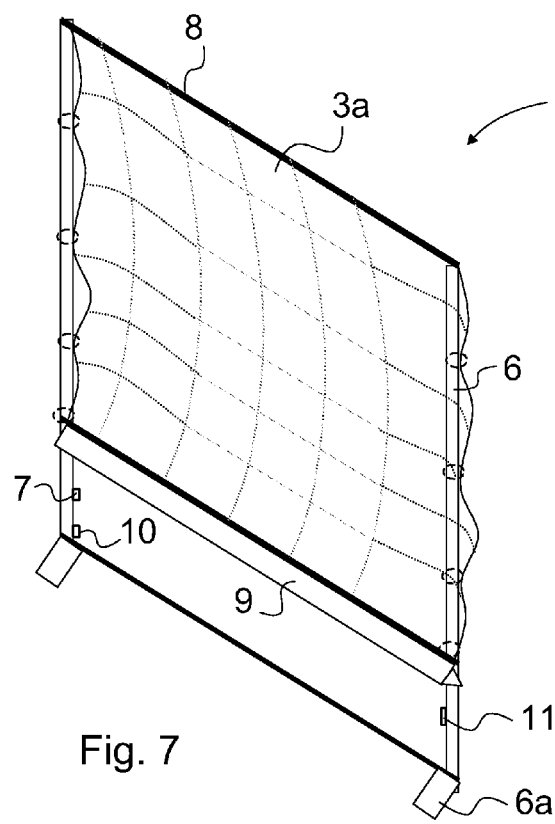
Figure 8:
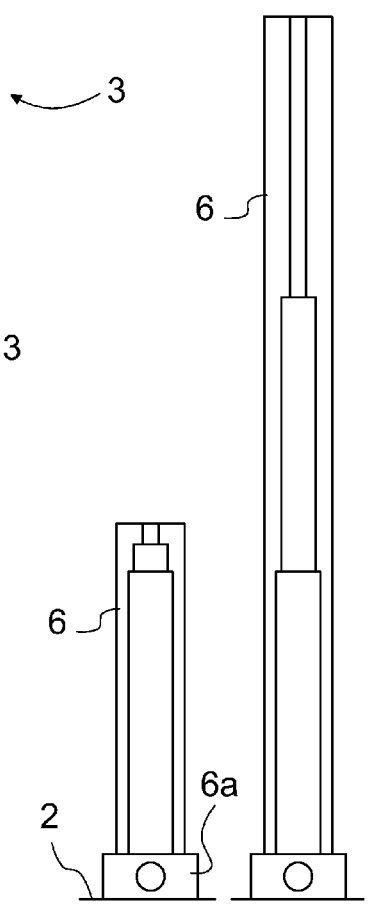

In the following, the invention will be described in detail by the aid of three examples by referring to the attached simplified and diagrammatic drawings, wherein FIG. 1 presents in a top view a wave energy recovery module where the tidal adjustment arrangement of the wave energy recovery system according to the invention can be used, FIG. 2 presents in a front view and in a simplified and diagrammatic way a plate like wing according to the invention in its lowermost position, FIG. 3 presents in a front view and in a simplified and diagrammatic way a plate like wing according to the invention in its uppermost position, FIG. 4 presents in a front view and in a simplified and diagrammatic way another plate like wing according to the invention in its lowermost position, FIG. 5 presents in a front view and in a simplified and diagrammatic way another plate like wing according to the invention in its uppermost position, FIG. 6 presents in a top view and in a simplified and diagrammatic way a sail like wing according to the invention in its lowermost position, FIG. 7 presents in a top view and in a simplified and diagrammatic way a sail like wing according to the invention in its uppermost position and FIG. 8 presents in a side view and in a simplified and diagrammatic way a height adjusting means of the wing according to the invention in its lowermost and uppermost positions.

In FIG. 1 a wave energy recovery module 1 where the tidal adjustment arrangement for the wave energy recovery system according to the invention can be used for recovering kinetic energy like wave energy or tidal energy of seawater. The wave energy recovery module 1 according to the example has been anchored in its production site onto the sea bottom and is situated for example in a so-called intermediate water area of the water basin. The intermediate water area refers here to the same area as in the WO publication No. WO2004097212, i.e. to the water basin area, generally ocean area in the depth range of the so-called breaker-line and shallow waters, extending to the wavelength of 0.5. In the intermediate water area the relation of the water depth to the principally prevailing wavelengths is between ½-1/20. In that water area the depth of the water is generally from about 8 m to 20 m, and the height of the surface of the water caused by the tide can fluctuate several meters. In its production site the wave energy recovery module 1 is capable to recover kinetic energy of the waves of the sea and convert the kinetic energy into electric energy. Likewise the wave energy recovery module 1 is capable to make fresh water from the seawater.

The wave energy recovery module 1 comprises at least a body 2 that functions as a base, one or more onto the body 2 attached recovery units 3 for recovering wave energy, collecting means 3c for collecting the energy recovered by the recovery units 3, a cable 4 for transferring the collected energy to further use, and a cable trough 5 equipped with a protective cover for joining all the recovery units 3 of the wave energy recovery module 1 at least into the collecting means 3c.

The body 2 is made for instance of concrete or steel and consists of a group of floating compartments, instrument and machinery chambers that are kept dry, and valve compartments at both ends of the body 2. In the valve compartments there are filling and discharge valves for air and filling and discharge valves for water. Water pipes and air pipes has been installed to go through the separation walls of the compartments in order to allow water and air to run into all the floating compartments and valve compartments. Thanks to its heavy concrete or steel structure the wave energy recovery module 1 remains steady on the sea bottom when the floating compartments are filled with water. Correspondingly floating compartments are big enough to allow the body 2 to float on the surface of the water when the floating compartments are filled with air.

Each recovery unit 3 comprises at least a plate like or sail like wing element 3a that is hinged onto the body 2 of the wave energy recovery module 1, and the recovering means or the power-take-of (PTO) means 3b of the wave energy. The wing element 3a is arranged to make reciprocating motion caused by the kinetic energy of the waves, and the recovered energy is either saved into the energy storages situated in the body 2 or transferred through the collecting means 3c and cable 4 to the use of the next unit that can be for instance a collecting station situated on shore. The fresh water produced by the wave energy recovery module 1 can be stored in containers situated in the body 2 of the wave energy recovery module 1, and delivered time to time for further use.

In FIGS. 2 and 3 a recovery unit 3 comprising two plate like wings 3a according to the invention is shown in a simplified and diagrammatic way in its lowermost and uppermost positions. In FIG. 2 both the wings 3a are in their lowermost position and in FIG. 3 the first wing 3a is in its uppermost position and the second wing 3a is in its lowermost position. It is possible that only the first wing 3a is movable up and down and the second wing 3a is fixed, but preferably both the wings 3a are movable up and down. That makes the adjustment more effective.

The body 2 onto which a pair of the support means 6 of the wings 3a is hinged with a pair of hinge means 6a is shown also in a simplified and diagrammatic way. The wings 3a are fastened to the support means 6 individually so that they can be moved separately in a vertical direction. The vertical movement of the wings 3a is implemented with the support means 6 that can be extended in a vertical direction. The support means 6 includes for instance hydraulic cylinders with two, three or more extendable cylinder parts.

This type of the recovery unit 3 is very versatile. During the low tide both the wings 3a are always lowered to their lowermost position as shown in FIG. 2. Correspondingly, during the high tide when the prevailing ocean conditions are normal both the wings 3a are elevated to their uppermost position or depending on the conditions one of the wings 3a is elevated to its uppermost position and another wing 3a is elevated somewhat lower in order to capture as much wave energy as possible. Whereas the prevailing ocean conditions are calm both the wings 3a are elevated to their uppermost position in order to cause as minimal as possible drag of water near the sea bottom where the water is not moving in the same phase than closer to the surface. And finally, when the prevailing ocean conditions are stormy one of the wings 3a is elevated to its uppermost position or close to it and another wing 3a is lowered to its lowermost position in order to cause as maximal as possible drag of water near the sea bottom to resist the power of the stormy water. The latter situation is shown in FIG. 3.

In FIGS. 4 and 5 another recovery unit 3 comprising a plate like wing 3a according to the invention is shown in a simplified and diagrammatic way in its lowermost and uppermost positions. In FIG. 4 the wing 3a is in its lowermost position and in FIG. 5 the wing 3a is in its uppermost position. The body 2 onto which a pair of the support means 6 of the wings 3a is hinged with a pair of hinge means 6a is shown also in a simplified and diagrammatic way. The wing 3a is fastened to the support means 6 so that it can be moved up and down in a vertical direction. The vertical movement of the wing 3a is implemented with the support means 6 that can be extended in a vertical direction. The support means 6 includes for example hydraulic cylinders with two, three or more extendable cylinder parts.

In FIGS. 6 and 7 yet another recovery unit 3 comprising a sail like wing 3a according to the invention is shown in a simplified and diagrammatic way in its lowermost and uppermost positions. In FIG. 6 the wing 3a is in its lowermost position and in FIG. 7 the wing 3a is in its uppermost position. The body 2 onto which a pair of the support means 6 of the wings 3a is hinged with a pair of hinge means 6a is not shown in the figures. The wing 3a is fastened to the support means 6 so that its upper edge 8 can be moved up and down in a vertical direction. The vertical movement of the upper edge 8 of the wing 3a is implemented with the support means 6 that can be extended in a vertical direction. The support means 6 includes for example hydraulic cylinders with two, three or more extendable cylinder parts.

The lower edge of the sail like wing 3a is rolled in a roll arranged in the horizontal casing 9 that is stationary fastened to both of the support means 6. The height adjustment is implemented with the support means 6 by extending the upper ends of the support means upwards and at the same time elevating the upper edge 8 of the wing 3a upwards to a needed level of height. The corresponding amount of sailcloth unwinds from the roll during the elevation. When the upper edge 8 is lowered the corresponding amount of sailcloth rewinds to the roll in the casing 9.

In FIG. 8 the support means 6 acting as height adjusting means of the wing 3a according to the invention is shown in its lowermost and uppermost position. The support means 6 is hinged at their lower end with the hinge 6a onto the body 2 of the wave energy recovery module 1. In this example the support means 6 includes a hydraulic cylinder as an actuating means but the actuating means can be also other kind of actuator, for instance a rack and pinion system or a linear actuator or alike.

The elevation and position of the wing 3a can be controlled in various ways. One way is to use public tide tables that include accurate enough predictions to give an easy and reliable way of controlling the height position of the wing 3a corresponding to the surface of water. The data of the tide tables is entered to the computer database of the wave energy recovery module 1 and it can be used continuously to control the height position of the wing 3*a*. Another way to control the tidal adjustment is to use a pressure sensor 7 or alike to measure the current height of the water surface. These two ways can be used also together. When the plate like wing 3*a* or the upper edge 8 of the sail like wing 3*a* is moved upwards or downwards the height position can be adjusted steplessly between the uppermost height position and the lowermost height position. A common feature to all the ways to control the elevation of the wing 3*a* is a position control means 10 of the wave energy recovery module 1 by which the controlling is done. The position control means 10 is connected to the control system of the wave energy recovery system and monitors the height position of the wing 3*a* keeping the position as optimal as possible in all situations.

The tidal adjustment arrangement for a wave energy recovery system according to the invention comprises also a detector means 11 to recognize the prevailing ocean conditions. The detector means 11 is connected to the control system of the wave energy recovery system and arranged to maximize the capture of energy by giving the information to position the wing 3*a* to the height that is as optimal as possible to the prevailing ocean conditions. The detector means 11 is also arranged to give the information to lower the wing 3*a* nearer to the sea bottom in relation of the strength of the sea conditions, and to give an order to elevate the wing 3*a* nearer to the surface of the water in order to maximize the capture of the wave energy in calm sea conditions.

It is obvious to the person skilled in the art that the invention is not restricted to the example described above but that it may be varied within the scope of the claims presented below. Thus, for example, the structure of the wave energy recovery unit can vary.

The invention claimed is:

1. A wave energy recovery system comprising:
  a body,
  a wing hinged at its lower edge onto the body to make a reciprocating motion in response to kinetic energy of waves or tidal currents;
  a power-take-off means; and
  a support means capable of changing a vertical position of an upper edge of the wing by changing the length of the wing from the lower edge to the upper edge.

2. The wave energy recovery system according to claim 1, further comprising a controller configured to control the support means to change the length of the wing.

3. The wave energy recovery system according to claim 1, wherein the support means is controlled to change the vertical position of the upper edge of the wing based on data of available tide tables.

4. The wave energy recovery system according to claim 1, wherein the support means is controlled to change the vertical position of the upper edge of the wing based on a pressure sensor configured to detect the current height of the water surface.

5. The wave energy recovery system according to claim 1, further comprising a detector configured to recognize the prevailing ocean conditions and connected to a control system of the wave energy recovery system, the support means being controlled to maximize a capture of energy by changing the length of the wing in order to position the upper edge of the wing to a height that is optimal according to the prevailing ocean conditions.

6. The wave energy recovery system according to claim 2, wherein a detector is configured to recognize the prevailing ocean conditions and to give an instruction to the controller to lower the height of the upper edge of the wing by decreasing the length of the wing by an amount corresponding to a detected strength of the sea conditions.

7. The wave energy recovery system according to claim 2, wherein a detector is configured to recognize the prevailing ocean conditions and to give an instruction to the controller to increase the length of the wing in order to elevate the upper edge of the wing nearer to the surface of the water when calm sea conditions are detected.

8. The wave energy recovery system according to claim 1,
  wherein the support means changes the position of the upper edge of the wing using a mechanical or electrical device, and
  wherein the support means changes the position of the upper edge of the wing automatically based on movement, speed or position of the wing, or based on controlled programming.

9. The wave energy recovery system according to claim 2, further comprising a detector configured to recognize the prevailing ocean conditions, the detector being connected to the controller of the wave energy recovery system, the support means being controlled to maximize a capture of energy by changing the length of the wing to position the upper edge of the wing to a height that is optimal according to the prevailing ocean conditions.

10. The wave energy recovery system according to claim 3, further comprising a detector configured to recognize the prevailing ocean conditions, the detector being connected to a control system of the wave energy recovery system, the support means being controlled to maximize a capture of energy by changing the length of the wing to position the upper edge of the wing to a height that is optimal according to the prevailing ocean conditions.

11. The wave energy recovery system according to claim 4, further comprising a detector configured to recognize the prevailing ocean conditions, the detector being connected to a control system of the wave energy recovery system, the support means being controlled to maximize a capture of energy by changing the length of the wing to position the wing to a height that is optimal according to the prevailing ocean conditions.

12. The wave energy recovery system according to claim 9, wherein the detector is arranged to give an instruction to lower the height of the upper edge of the wing by decreasing the length of the wing by an amount corresponding to a detected strength of the sea conditions.

13. The wave energy recovery system according to claim 10, wherein the detector is arranged to give an instruction to lower the height of the upper edge of the wing by decreasing the length of the wing by an amount corresponding to a detected strength of the sea conditions.

14. The wave energy recovery system according to claim 11, wherein the detector is arranged to give an instruction to lower the height of the upper edge of the wing by decreasing the length of the wing by an amount corresponding to a detected strength of the sea conditions.

15. The wave energy recovery system according to claim 5, wherein the detector is arranged to give an instruction order to lower the height of the upper edge of the wing by decreasing the length of the wing by an amount corresponding to a detected strength of the sea conditions.

16. The wave energy recovery system according to claim 9, wherein the detector is arranged to give an instruction to increase the length of the wing in order to elevate the upper edge of the wing nearer to the surface of the water when calmer sea conditions are detected.

17. The wave energy recovery system according to claim 10, wherein the detector is arranged to give an instruction to increase the length of the wing in order to elevate the upper edge of the wing nearer to the surface of the water when calmer sea conditions are detected.

18. The wave energy recovery system according to claim 11, wherein the detector is arranged to give an instruction to increase the length of the wing in order to elevate the upper edge of the wing nearer to the surface of the water when calmer sea conditions are detected.

19. The wave energy recovery system according to claim 5, wherein the detector is arranged to give an instruction to increase the length of the wing in order to elevate the upper edge of the wing nearer to the surface of the water when calmer sea conditions are detected.

20. The Tidal adjustment arrangement for a wave energy recovery system according to claim 6, wherein the detector is arranged to give an instruction to the controller to increase the length of the wing in order to elevate the wing nearer to the surface of the water when calmer sea conditions are detected.

* * * * *